US010012278B2

(12) United States Patent
Krause et al.

(10) Patent No.: US 10,012,278 B2
(45) Date of Patent: Jul. 3, 2018

(54) FRICTION RING BODY FOR A RAIL WHEEL BRAKE AND RAIL WHEEL BRAKE

(71) Applicant: Faiveley Transport Witten GmbH, Witten (DE)

(72) Inventors: Henrik Krause, Dortmund (DE); Sebastian Wurth, Wipperfürth (DE); Andreas Mehlan, Unna (DE)

(73) Assignee: Faiveley Transport Witten GmbH, Witten (DE)

( * ) Notice: Subject to any disclaimer, the term of this patent is extended or adjusted under 35 U.S.C. 154(b) by 15 days.

(21) Appl. No.: 14/909,227

(22) PCT Filed: Jun. 24, 2014

(86) PCT No.: PCT/EP2014/063291
§ 371 (c)(1),
(2) Date: Feb. 1, 2016

(87) PCT Pub. No.: WO2015/014542
PCT Pub. Date: Feb. 5, 2015

(65) Prior Publication Data
US 2016/0186823 A1    Jun. 30, 2016

(30) Foreign Application Priority Data
Aug. 2, 2013   (DE) .................... 20 2013 103 487 U

(51) Int. Cl.
*F16D 65/12*     (2006.01)
*F16D 65/092*    (2006.01)
(Continued)

(52) U.S. Cl.
CPC .......... *F16D 65/124* (2013.01); *B61H 11/00* (2013.01); *F16D 65/092* (2013.01);
(Continued)

(58) Field of Classification Search
CPC .... F16D 65/123; F16D 65/124; F16D 65/128; F16D 2065/138; F16D 2065/1392;
(Continued)

(56) References Cited

U.S. PATENT DOCUMENTS 5,101,940 A * 4/1992 Mungo ................ F16D 65/124
                                            188/218 XL
6,032,769 A * 3/2000 Daudi ................ F16D 65/0006
                                            188/218 R
(Continued)

FOREIGN PATENT DOCUMENTS

DE    94 07 392 U1    7/1994
DE    43 43 711 A1    6/1995
(Continued)

OTHER PUBLICATIONS

Machine translation of FR 2927389 (no date).*
(Continued)

*Primary Examiner* — Nicholas J Lane
(74) *Attorney, Agent, or Firm* — Kelly & Kelley, LLP

(57) ABSTRACT

In order to devise a friction ring body for arrangement on the wheel web of a rail wheel for a rail vehicle for forming a rail wheel brake that can be easily produced, it is proposed that the friction ring body has a friction ring cut out of a flat metal material and a plurality of attachment bodies provided on the friction ring by means of an integrally bonding connection process.

13 Claims, 2 Drawing Sheets

(51) Int. Cl.
*F16D 65/847* (2006.01)
*B61H 11/00* (2006.01)

(52) U.S. Cl.
CPC .......... *F16D 65/847* (2013.01); *F16D 65/123* (2013.01); *F16D 2200/003* (2013.01); *F16D 2250/0076* (2013.01)

(58) Field of Classification Search
CPC ..... F16D 2065/1356; F16D 2065/1336; F16D 2065/1328
USPC .................................................. 188/218 XL
See application file for complete search history.

(56) References Cited

U.S. PATENT DOCUMENTS

| | | | | |
|---|---|---|---|---|
| 9,400,024 | B2* | 7/2016 | Nogami | .................. B61H 5/00 |
| 2014/0339027 | A1* | 11/2014 | Wurth | .................. F16D 65/123 |
| | | | | 188/218 XL |

FOREIGN PATENT DOCUMENTS

| | | | |
|---|---|---|---|
| DE | 44 17 813 A1 | 11/1995 | |
| DE | 101 04 039 A1 | 8/2002 | |
| DE | 20 2009 014768 U1 | 3/2011 | |
| DE | 20 2011 052 265 U1 | 3/2013 | |
| DE | 20 2011 052 267 U1 | 3/2013 | |
| EP | 1 460 283 A1 | 9/2004 | |
| EP | 1 298 333 B1 | 7/2006 | |
| FR | 2927389 A1 * | 8/2009 | ............. F16D 65/12 |
| GB | 2130321 A * | 5/1984 | ........... F16D 65/124 |
| JP | 2000240697 A | 9/2000 | |
| JP | 2003294066 A | 10/2003 | |
| JP | 2007205428 A | 8/2007 | |
| JP | 2009250325 A | 10/2009 | |
| JP | 2013104530 A | 5/2013 | |
| WO | 2010/108671 A1 | 9/2010 | |

OTHER PUBLICATIONS

German Search Report for the German patent application No. 202013103487.8 dated Feb. 19, 2014.
Chinese Office Action for the Application No. 201480043301.0 dated Jan. 17, 2018.
Japanese Office Action for the Application No. 2016-530393 dated Apr. 4, 2017.

* cited by examiner

FRICTION RING BODY FOR A RAIL WHEEL BRAKE AND RAIL WHEEL BRAKE

FIELD OF INVENTION

The present invention relates to a rail wheel brake for arrangement on the wheel web of a rail wheel for a rail vehicle for forming a rail wheel brake and also relates to such a rail wheel brake.

BACKGROUND OF THE INVENTION

EP 1 460 283 A1 for example shows friction ring bodies in arrangement on the wheel web of a rail wheel for a rail vehicle for forming a rail wheel brake. The friction ring bodies are made of cast steel and have moldings with which the friction ring bodies rest against the surface of the wheel web. The moldings also serve for receiving through-bolts to screw the friction ring bodies against each other by passing the through-bolts through the holes in the wheel web. The shown geometry of the friction ring bodies can be produced in a practical technical way only with a relatively complex molding method.

Further friction ring bodies for arrangement on the wheel web of a rail wheel are shown in EP 1 298 333 B1 and in DE 44 17 813 A1. The production of such friction ring bodies by casting requires technically complicated molds, especially if the friction ring bodies have moldings with which they rest against the wheel web of the rail wheel and if the friction ring bodies for example must have cooling fins to cool the friction rings.

SUMMARY OF THE INVENTION

Therefore the object of the invention is a further development of easily producible friction ring bodies for arrangement on the wheel web of a rail wheel for forming a rail wheel brake. In particular, the friction ring bodies should be able to be easily fitted with attachment bodies, wherein the attachment bodies should in particular form cooling bodies and/or connection bodies by which the friction rings can be connected to the wheel web.

This object is solved starting from a friction ring body according to the preamble of claim 1 and starting from a rail wheel brake according to the preamble of claim 11 with the respective characterizing features. Advantageous developments of the invention are specified in the dependent claims.

The invention includes the technical teaching that the friction ring body has a friction ring cut out of a flat metal material and several attachment bodies arranged at the friction ring by means of an integrally bonding connection process.

The invention therefore proposes friction ring bodies which can be manufactured in a two-dimensional manufacturing process, so that the provision of a flat metal material, such as a flat steel material or a flat aluminum material is already sufficient to cut the friction ring body two-dimensionally out of the flat metal material with the required contour. The cutting processes for cutting out the friction ring bodies from a flat metal material which can be provided for example by the meter or as a continuous product may concern known methods such as a laser beam cutting, water jet cutting, a thermal cutting or a shear cutting method. In this way the friction ring bodies can be provided according to the invention in the simplest way without the use of a casting method, wherein the friction ring bodies and the cut surfaces, or at least the outer contour and the inner contour can optionally be finished mechanically. Here it is a major advantage that the attachment bodies can be available as individual parts, and the attachment bodies are arranged at the friction ring by means of an integrally bonding connection process.

The attachment bodies can be designed in various ways and can perform different functions. For example, the attachment bodies can form cooling elements, by which a cooling air flow can be formed between the friction ring and the wheel web when the friction ring body is arranged at the wheel web. Further, the attachment bodies may form connection bodies, by which the friction ring is connected to the wheel web. In this way the connection bodies can have a cooling function, as well. Thus, attachment bodies may be provided which are arranged as a cooling element only at the surface of the friction ring and have a distance to the surface of the wheel web. The connection bodies on the other hand extend from the surface of the friction ring to the surface of the wheel web. The cooling element can be configured lamellarly, in a rectangular shape, a semicircular shape, a trapezoidal shape or in any other advantageous shape, and if the cooling elements form flat, lamellar bodies, these can preferably be arranged extending fan-shaped in radial direction on the inside of the friction ring.

Particularly advantageously the integrally bonding connection between the attachment bodies and the friction ring may be formed by a soldered connection or by a welded connection. The attachment bodies, as well as the friction rings, can be cut out of a flat metal material, particularly a flat steel material or a flat aluminum material. Consequently, according to the invention the friction ring body with its essential components, namely the friction rings and the connecting bodies is cut out of flat metal materials, which according to the invention provides a particularly simple and economical possibility of manufacturing. Here, the attachment bodies need not necessarily have a planar extent which is larger than the thickness of the attachment bodies. The attachment bodies can be dice-shaped, block-shaped, cylindrical, trapezoidal or as truncated pyramids or the like, wherein the boundary of the attachment bodies is preferably manufactured by method of sections. The attachment bodies are attached to the surface of the friction ring body and optionally to the surface of the wheel web of the rail wheel with the surface which forms the surface of the sheet metal material. The cut surfaces which maybe have poorer dimensional accuracies and surface qualities can serve as open spaces, wherein the open spaces can be finished as well to increase the surface quality.

The friction ring and/or the attachment bodies can for example be cut out of a sheet metal by a laser cutting method, a water jet cutting method or a thermal cutting process. In principle, it is also conceivable to manufacture the friction ring and/or the attachment body by a shear cutting method. A further significant advantage arises in that different materials can be used for the provision of the friction rings and for the provision of the attachment bodies. Thus, the flat metal material for the friction rings may be, for example, a wear-optimized material, whereas the flat metal material for forming the attachment bodies can particularly be less expensive. In addition, advantages can be used which result from the use of a flat-rolled metal material, which for example is already highly compressed by the rolling process during the manufacturing and thus has a higher work hardening than it would be achievable with any casting material.

According to a further advantageous embodiment of the friction ring body the connecting bodies can be placed on a flat surface of the friction ring, or it is provided that the attachment bodies are at least partially inserted into recesses or holes in the friction ring. In this case the attachment bodies preferably form connection bodies, wherein an integrally bonding connection between the attachment body and the friction ring may optionally be omitted when the connection bodies are inserted in recesses or holes, as the insertion of the attachment body into the hole already creates a positive locking.

The attachment bodies may have a preferably tangential, duct-shaped recess which allows a convection cooling of the attachment body by means of air flow, as the attachment bodies are arranged in a ventilation gap between the friction ring and the wheel web. Here, the attachment bodies with the tangential duct-shaped notch can preferably form the connection bodies.

Also it can be provided that the attachment bodies have a notch with radially extending, in particular plane-parallel side surfaces. For this purpose guide elements can be provided, which are preferably held in a positive-fitting manner on the rail wheel by means of clamping sleeves and which are glidingly guided in the radial notches of the attachment bodies. This creates a positive connection between the wheel web and the friction ring, as a first positive connection is created between the guiding element and the wheel web by the clamping sleeve, and the other positive connection is created by the guided intake of the guiding element in the radially extending notches in the attachment body. The attachment body itself may again be inserted positively into a hole or in a recess in the friction ring. The particular advantage of guiding the guiding elements in the attachment body in radial direction is that small movements are made possible by thermal expansions in the friction ring without causing excessive tension of the friction ring in the arrangement on the wheel web.

The object of the present invention is also solved by a rail wheel brake with a rail wheel, comprising a hub and a rim having a running surface, wherein a wheel web extends between the wheel hub and the rim, and wherein friction ring bodies are arranged on both sides of the wheel web. Here it is provided that the friction ring bodies each have a friction ring cut out of a flat metal material and several attachment bodies arranged at the friction ring by means of an integrally bonding connection.

For connecting the friction rings with the wheel web screw elements may be provided, and the friction rings can be clamped to one another on both sides of the wheel web. In this case the connection bodies may be in a clamp arrangement with the screw elements and the friction rings. The screw elements are thus used as a tie rod and can have screw heads and nuts which can be seated positively in the connection bodies and a screw shaft extends through a hole that is cut into the wheel web. With this the screw heads and/or the nuts are below the friction surface of the friction rings, on which the brake pads of the rail wheel brake can slide freely.

Furthermore, it can be provided that the screw elements are guided through the clamping sleeves, and the screw elements may have a screw shaft which in the passage area through the clamping sleeve has a smaller diameter than the inner diameter of the clamping sleeve. This allows a slight movement of the screw elements for example in radial or circumferential direction within the clamping sleeve, for example during a thermal expansion of the friction rings. Consequently an expansion of the friction rings, which produces an increase in diameter and thus a drift of the screw elements within the clamping sleeve, does not lead to an excessive tension. For example, the thermal expansion of the friction rings can be compensated by a movement of the screw elements within the clamping sleeves in radial direction.

BRIEF DESCRIPTION OF THE DRAWINGS

Further, measures improving the invention are described below in greater detail together with the description of preferred embodiments of the invention with reference to the figures.

DETAILED DESCRIPTION OF THE PREFERRED EMBODIMENTS

Figure 1:
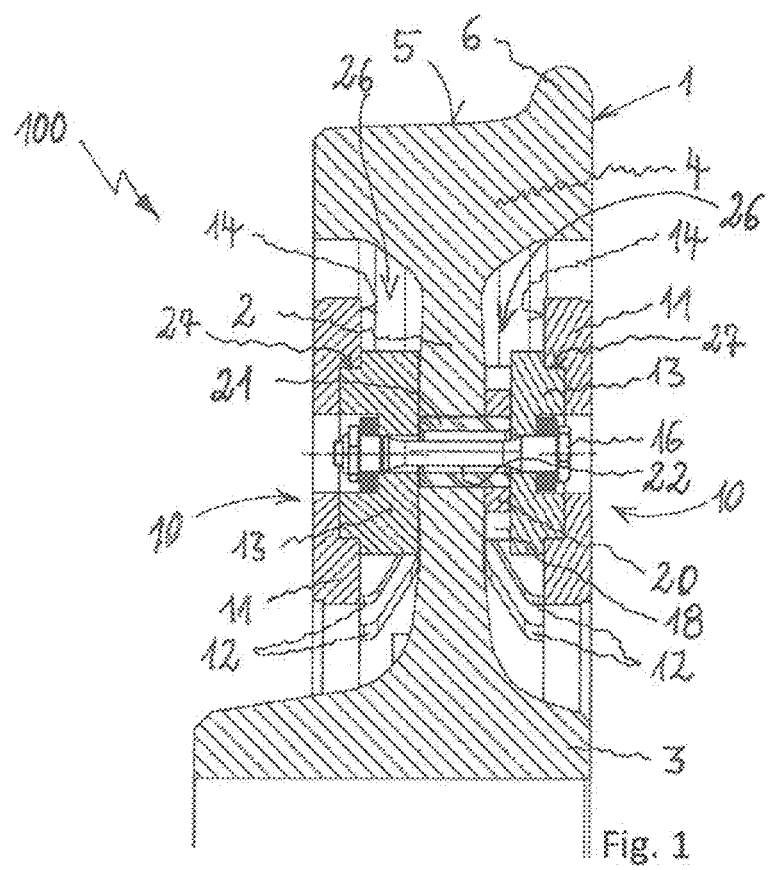
FIG. 1 shows a cross-sectional view through the upper half of a rail wheel brake with a rail wheel, with friction ring bodies arranged on both sides of the rail wheel which are designed with the features of the present invention.

FIG. 1 shows an embodiment of a rail wheel brake 100 with a rail wheel 1, and friction ring bodies 10 are embodied according to the invention are arranged at the rail wheel 1. The rail wheel brake 1 has a wheel web 2 which extends in a plate-shaped way in a radial plane between a hub 3 and a rim 4, and a running surface 5 is situated at the wheel rim 4 which on the right side merges into a flange 6. The rail wheel 1 is therefore configured for rolling on a rail and may be part of the chassis of a railway vehicle. The rail wheel 1 is provided with friction ring bodies 10, and friction pads, which are not shown, are provided, which are brought into contact on the outside with the friction ring bodies 10 for braking the rail wheel 1.

The friction ring bodies 10 are configured to run around the axis of the rail wheel 1 in an annular manner and are dimensioned in such a way that the friction ring bodies 10 can be arranged on the wheel web 2 in the radially extending area between the wheel hub 3 and the rim 4. The friction ring bodies 10 have friction rings 11, against which the brake pads (not shown) of the rail wheel brake 100 can be pressed. Furthermore, the friction ring bodies 10 comprise attachment bodies 12 and 13, and the attachment bodies 12 and 13 are arranged on the inner surface 14 of the friction rings 11, which faces toward the wheel web 2 and forms the opposite surface of the friction surface of the friction rings 11.

The attachment bodies 12 are configured as cooling elements 12 and protrude into the ventilation gap 26 without touching the surface of the wheel web 2. The cooling elements 12 are configured lamellarly and are integrally bonded on the surface 14 of the friction rings 12.

The attachment bodies 13 form connection bodies 13 which are seated between the surface 14 of the friction rings 11 and the surface of the wheel web 2. Here, the connection bodies 13 are planar seated or positively inserted in a recess 27 in the surface 14 of the friction rings 11 and may there be also integrally bonded to the friction rings 11.

The friction rings 11 and the attachment bodies 12 and 13 are each cut out of flat metal material, for example by a laser cutting method, a water jet cutting method or by a thermal cutting process.

A screw element 16 extend through the wheel web 2, which is seated in receiving notches in the connection bodies 13 and connects the connection bodies 13 with each other on both sides of the wheel web 2. By the connection formed with the screw element 16 the friction ring bodies 10 are held positively at the wheel web 2 of the rail wheel 1.

On the right side of the wheel web 2 the connection body 13 is formed with a notch 18 which extends in the radial direction of the rail wheel 1. A guide member 20 is inserted into the notch 18, which is connected in a positive locking with the wheel web 2 via a clamping sleeve 21. Through the notch 18 longitudinally extending in radial direction, the guide member 20 can slide in the notch 18 to be able to compensate radial displacements of the friction ring 11, for example due to thermal effects, wherein the guide member 20 is arranged in a fixed position at the wheel web 2 by the clamping sleeve 21.

The screw element 16 has a screw shaft 22 having a smaller outer diameter than the inner diameter of the clamping sleeve 21. This avoids any tensions during a radial expansion of the friction ring 11, which may cause a drift in the position of the screw element 16.

The guide element 20 in assembly in the notch 18 in the connector element 13 is shown only on the right side, and, distributed along the circumference of the rail wheel 1, several screw connections can be provided with the screw element 16 and the clamping sleeve 21 together with the guide element 20. The arrangement of the guide element 20 and the clamping sleeve 21 can be provided alternately on the left and on the right side.

Figure 2:
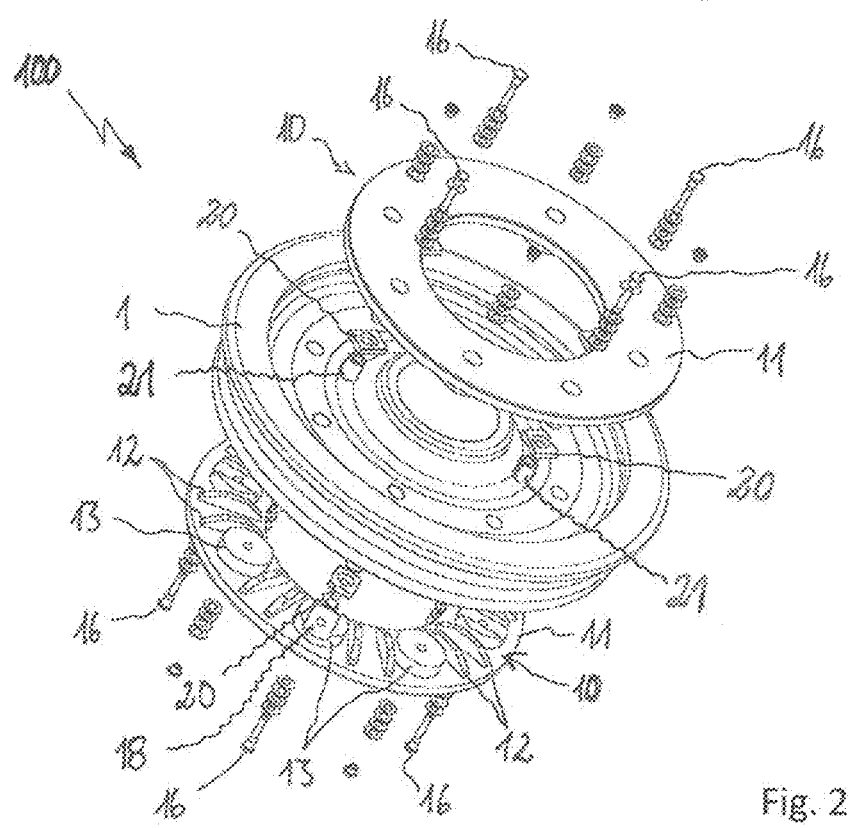
FIG. 2 shows a flying view of the rail wheel brake in an unassembled configuration.

FIG. 2 shows an exploded view of the rail wheel brake 100 with the rail wheel 1, and in a flying arrangement the friction ring bodies 10 are shown spaced apart from the rail wheel 1 on both sides. In the bottom view of the friction ring body 10 the attachment bodies 12 and 13 are visible, which are embodied once as a cooling element 12 and once as a connection body 13. Further shown are the screw elements 16 to connect the friction ring bodies 10 with each other, and to connect them with the rail wheel 1. In the inside view of the lower friction ring 11, the connection bodies 13 are shown with the notches 18, in which the guide elements 20 can be seated, further shown are the clamping sleeves 21, which can be inserted into holes in the wheel web 2. For a more detailed embodiment of the friction ring bodies 10 in the following FIGS. 3a, 3b and 3c several variants are shown as described below.

Figures 3A, 3B, 3C:
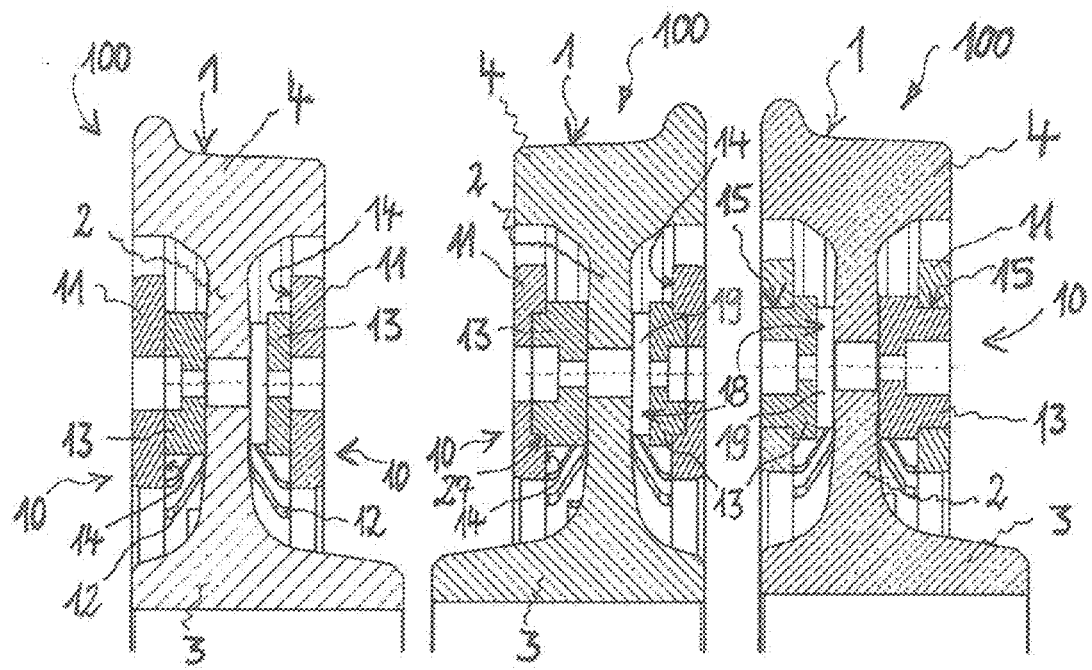
FIG. 3a shows a cross-sectional view of a rail wheel brake with attachment bodies, which are arranged at the friction ring according to a first embodiment.
FIG. 3b shows a cross sectional view of a rail wheel brake with attachment bodies, which are arranged at the friction ring according to a second embodiment.
FIG. 3c shows a cross-sectional view of a rail wheel brake with attachment bodies, which are arranged at the friction ring according to a third embodiment.

FIGS. 3a, 3b and 3c respectively show rail wheel brakes 100 having a rail wheel 1, a wheel web 2 in a radial plane of extension between a wheel hub 3 and a wheel rim 4. On both sides of the wheel web 2 friction ring bodies 10 with respective friction rings 11 and attachment bodies 12 and 13 are arranged.

FIG. 3a shows an embodiment in which the connection bodies 13 are applied in a planar manner to the inner surface 14 of the friction rings 11. For fastening the connection bodies 13, they can be applied in an integrally bonded connection on the surface 14, for example by a welding method or a soldering method. Similarly, the cooling elements 12 may be applied to the surface 14.

FIG. 3b shows an embodiment for connecting the connection bodies 13 with the friction rings 11, wherein recesses 27 are provided on the surface 14, into which the connection bodies 13 are inserted, so that in addition to a not further shown integrally bonded connection between the connection bodies 13 and the friction rings 11 a positive connection is formed. On the right side of the wheel web 2 the connection body 13 is shown as an example with a notch 18 which is bounded by a side surface 19 of the notch 18, and it can be seen that the notch 18 runs in radial direction between the wheel hub 3 and the rim 4.

FIG. 3c finally shows an embodiment for forming a connection between the connection body 13 and the friction ring 11 in which holes 15 are cut into the friction rings 11, through which the connection bodies 13 extend and are flush with the outer surface of the friction rings 11. By this, next to the not shown integrally bonded connection, a positive connection between the connection body 13 and the friction rings 11 is created. The example shows a notch 18 with a side surface 19 on the left side of the wheel web 2, while the connection body 13 on the right side does not show the notch.

Figures 4, 5:
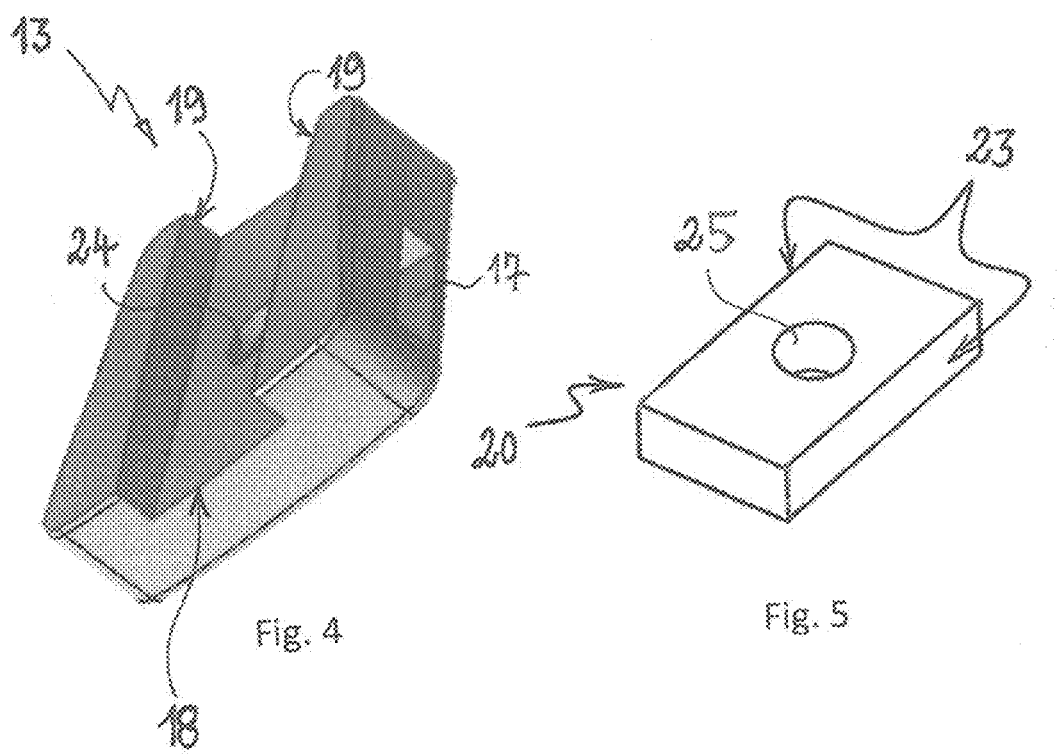
FIG. 4 shows a perspective view of a connection body.
FIG. 5 shows a perspective view of a guiding element.

FIG. 4 shows a perspective view of a connection body 13 with a notch 18 which is laterally bounded by two side surfaces 19, and in the notch 18 a guide member 20 can be inserted according to FIG. 5. The connection body 13 has a screw passageway 24, and the guide element 20 has a bore 25 for receiving the clamping sleeve 21, wherein the inner diameter of the clamping sleeve 21 has a larger diameter than the screw shaft 22 of the screw element 16, see FIG. 1. The screw passageway 24 in the connection body 13 can form a fit with the diameter ranges at the ends of the screw element 16, so that a radial movement of the screw element 16 relative to the connection body 13 is prevented.

In order to slide the guide element 20 in the notch 18 in the connection body 13 the guide element 20 is bounded by lateral guide surfaces 23, which slide on the side surfaces 19 of the notch 18 in the connection body 13.

The invention is not limited in its embodiment to the above-described preferred embodiment. Rather, a number of variants are conceivable, which make use of the described solution also for basically different embodiments. All features and/or advantages arising from the claims, the description or the figures, including structural details, spatial arrangements and process steps, can be essential to the invention both by themselves or in arbitrary combinations.

The invention claimed is:

1. A friction ring body for arrangement on a wheel web of a rail wheel for a railway vehicle for forming a rail wheel brake, characterized in that the friction ring body has a friction ring cut out of a flat metal material and a plurality of attachment bodies provided on a surface of the friction ring by means of an integrally bonded connection process, that the attachment bodies are at least partially inserted into holes in the friction ring, that a first subset of the attachment bodies form cooling elements, by which a flow of cooling air between the friction ring and the wheel web can be formed when the friction ring body is arranged at the wheel web, that a second subset of the attachment bodies form connection bodies via which the friction ring is attached to the wheel web, that the cooling elements are arranged only at the surface of the friction ring such that the cooling elements have a distance to a surface of the wheel web when the friction ring body is arranged at the wheel web, and that the connection bodies extend from the surface of the friction ring to the surface of the wheel web when the friction ring body is arranged at the wheel web.

2. A friction ring body according to claim 1, characterized in that the friction ring is cut out of a flat steel material or a flat aluminum material.

3. A fiction ring body according to claim 1, characterized in that the integrally bonded connection between the attachment bodies and the friction ring comprises a solder joint or a welded joint.

4. A friction ring body according to claim 1, characterized in that the attachment bodies are cut out of a flat steel material or a flat aluminum material.

5. A friction ring body according to claim 1, characterized in that the friction ring and/or the attachment bodies are cut out of a sheet metal material by means of a laser cutting process, a water jet cutting method or a thermal cutting process.

6. A friction ring body according to claim 1, characterized in that the attachment bodies are seated on a planar surface of the friction ring.

7. A friction ring body according to claim 1, characterized in that the attachment bodies have a tangential, duct-shaped notch, which allows convection cooling of the attachment body by means of air flow.

8. A friction ring body according to claim 7, characterized in that the attachment bodies have a radially extending notch with plane-parallel side surfaces.

9. A friction ring body according to claim 8, characterized in that guide elements are provided, which are held in a positive-fitting manner on the rail wheel by means of clamping sleeves and are glidingly guided in the radial notches of the attachment bodies.

10. A rail wheel brake having a rail wheel comprising a wheel hub and a rim with a running surface, wherein a wheel web extends between the wheel hub and the rim, and wherein friction ring bodies are arranged at the wheel web on both sides of the wheel web, characterized in that the friction ring bodies each have a friction ring cut-out from a flat metal material and several attachment bodies arranged on a surface of the friction ring by means of an integrally bonding connection process, and that the attachment bodies are at least partially inserted into holes in the friction ring, that a first subset of the attachment bodies form cooling elements, by which a flow of cooling air between the friction ring and the wheel web can be formed, that a second subset of the attachment bodies form connection bodies via which the friction ring is attached to the wheel web, that the cooling elements are arranged only at the surface of the friction ring and have a distance to a surface of the wheel web, and that the connection bodies extend from the surface of the friction ring to the surface of the wheel.

11. A rail wheel brake according to claim 10, characterized in that screw elements are provided with which the friction rings are clamped to one another on both sides of the wheel web and connection bodies are arranged with the screw elements in a clamp arrangement.

12. The rail wheel brake according to claim 11, characterized in that the screw elements are passed through clamping sleeves, wherein the screw elements have a screw shaft which in the passage area through the clamping sleeve has a smaller diameter than the inner diameter of the clamping sleeve.

13. A rail wheel brake with a friction ring body according to claim 1.

* * * * *